GEORGE G. LOBDELL.
Improvement in Mechanism for Adjusting and Securing Car-Wheels to Axles.

No. 114,452.            Patented May 2, 1871.

WITNESSES
Jas. B. Harding
Harry Smith

G. G. Lobdell
by his Atty.
Howson and Son

UNITED STATES PATENT OFFICE.

GEORGE GRANVILLE LOBDELL, OF WILMINGTON, DELAWARE.

IMPROVEMENT IN MECHANISMS FOR ADJUSTING AND SECURING CAR-WHEELS TO AXLES.

Specification forming part of Letters Patent No. 114,452, dated May 2, 1871.

I, GEORGE GRANVILLE LOBDELL, of Wilmington, county of New Castle, State of Delaware, have invented Improvements in Mechanism for Adjusting and Securing Car-Wheels on their Axles, of which the following is a specification:

Nature and Object of Invention.

My invention relates to an improvement in the mechanism for adjusting and securing car-wheels on their axles for which Letters Patent were granted to myself and A. McLeod, May 24, A. D. 1870; and my improvement consists of a device too fully explained hereafter to need preliminary description, whereby the loosening of the keys which secure the wheels to the axle is prevented.

Description of the Accompanying Drawing.

Figure 1:
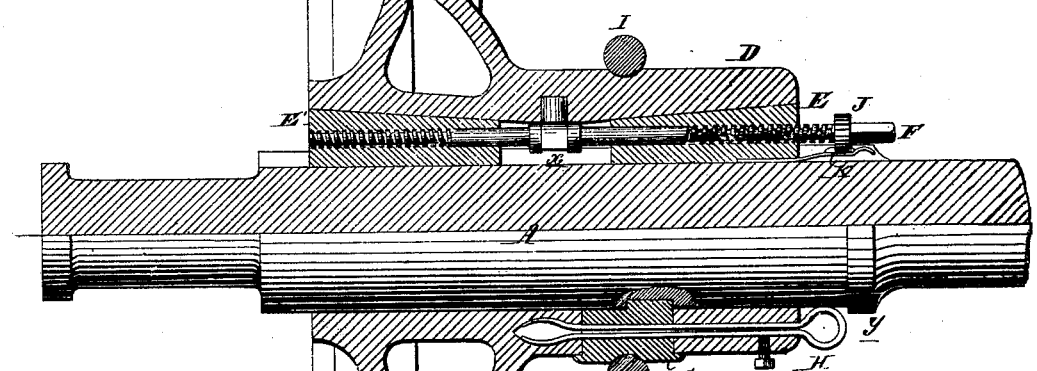
Figure 2:
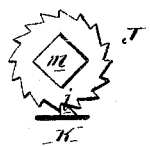
Figure 3:
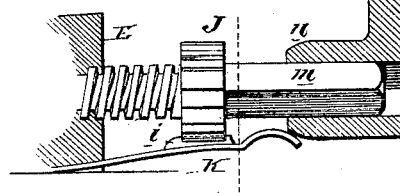
Figure 4:
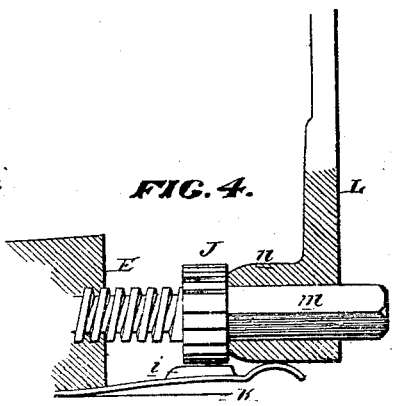

Figure 1 is a vertical section of an adjustable car-wheel and part of an axle with my improvement; and Figs. 2, 3, and 4, detached views, illustrating my invention.

General Description.

A represents part of an axle, and B the wheel, rendered adjustable thereon, and secured after adjustment by devices so fully explained in the Letters Patent granted to myself and A. McLeod on the 24th day of May, A. D. 1870, that a brief description will suffice in the present instance.

The wheel has an elongated hub, D, so as to admit two keys, E and E', tapered in contrary directions, and adapted to a groove in the axle and a keyway in the hub of the wheel. These keys are controlled by a screw-rod, F, which has a right-handed thread adapted to one key and a left-handed thread adapted to the other, the rod being retained longitudinally in the middle by a stud, $x$, projecting from the inside of the hub of the wheel.

A block, G, fits in the hub, and has a projection adapted to a recess in the axle, this block being retained in its place by a split key, H, as well as by a rubber band, I, which embraces the hub of the wheel.

When it is desired to adjust the wheels to a narrow-gaged track the keys E and E' are loosened by operating the screw-rod F, the split key and rubber band I are removed, the block G withdrawn, and the wheel moved along the axle to the collar $y$, when the block G, having been reversed, is reinserted in its place, secured by the key H and band I, and the keys E and E' are tightened.

The above-described parts appear in the aforesaid patent of May 24, A. D. 1870.

My present invention consists of a device for preventing the keys E and E' from becoming loose, which they are sometimes apt to do, owing to the constant jarring of the wheel, which occasionally tends to turn the screw-rod.

Near the outer end of the screw-rod is a ratchet-wheel, J, to the teeth of which is adapted a projection, $i$, on a spring-pawl, K, secured to the under side of the key E, and having a tendency to retain its projection $i$ in gear with the teeth of the ratchet-wheel.

The end of the screw-rod is made square, and is adapted to a square hole in the hub $n$ of the screw-key L, and the inner end of this hub is rounded or beveled, so that when it is pushed onto the square end of the screw-rod it will bear on the end of the spring K, depress the same, and withdraw the projection $i$ of the spring from the teeth of the ratchet-wheel, thereby permitting the screw-rod to be turned by the screw-key L, on withdrawing which, however, the spring will recoil, and its projection $i$ will again serve to prevent the turning of the said screw-rod, and as long as the latter is retained there can be no possibility of the loosening of the keys.

In place of the ratchet-wheel J a plain wheel with holes or notches in its periphery may be used, the projection $i$ on the spring-pawl being, of course, made to coincide with the holes or notches.

Claims.

1. The combination, with the keys E and E' and screw-rod F, of a ratchet-wheel, J, or its equivalent, and spring-pawl K, secured to the key E, all substantially as set forth.

2. The combination of the beveled or rounded hub of the screw-key L, screw-rod F, and spring-pawl K.

In testimony whereof I have signed my name to this specification in the presence of two subscribing witnesses.

GEORGE G. LOBDELL.

Witnesses:
WM. A. STEEL,
JNO. B. HARDING.